310-13 SR

FIP8502 XR 4,242,606

United States Patent [19]

Nonnenmann

[11] 4,242,606

[45] Dec. 30, 1980

[54] MAGNETIC FINAL CONTROL ELEMENT FOR A REGULATOR APPARATUS

[75] Inventor: Wolfgang Nonnenmann, Pforzheim, Fed. Rep. of Germany

[73] Assignee: Robert Bosch GmbH, Stuttgart, Fed. Rep. of Germany

[21] Appl. No.: 18,496

[22] Filed: Mar. 8, 1979

[30] Foreign Application Priority Data

Mar. 8, 1978 [DE] Fed. Rep. of Germany ....... 2809975

[51] Int. Cl.[3] ........................................ H02K 41/00

[52] U.S. Cl. ........................................ 310/12; 310/14; 310/13; 310/27

[58] Field of Search ........................................ 310/12-14, 310/27

[56] References Cited

U.S. PATENT DOCUMENTS

| | | | |
|---|---|---|---|
| 3,965,377 | 6/1976 | Carbonneau | 310/14 |
| 4,040,445 | 8/1977 | McCormick | 310/13 X |

*Primary Examiner*—Donovan F. Duggan

*Attorney, Agent, or Firm*—Edwin E. Greigg

[57] ABSTRACT

A preferred form of embodiment of the final control element comprises a direct-current electromagnet, with whose armature the regulator rod is connected; an inductive displacement transducer generating an electric output signal proportional to the stroke and having a pickup spool and a transducer rod connected to the regulator rod and influencing the inductivity of the pick-up spool in a stroke-proportional manner; and a restoring spring embodied as a helical compression spring, whose stroke-proportional restoring force acts counter to the attracting force of the magnet, which is proportional to the exciter current.

12 Claims, 2 Drawing Figures

MAGNETIC FINAL CONTROL ELEMENT FOR A REGULATOR APPARATUS

BACKGROUND OF THE INVENTION

The invention relates to a magnetic final control element for a regulator apparatus particularly for use in an electronically regulated fuel injection system for motor vehiches.

In a magnetic final control element of this type, experimentally tested in connection with Diesel fuel injection systems for motor vehicles, the restoring spring is embodied as a helical compression spring which concentrically surrounds the displacement transducer and disposed adjacent to the magnet in the final control element assembly housing, with a course of its longitudinal axis arranged parallel to the central axis of the magnet, along which the armature moves. The force-displacement coupling between the armature of the magnet and the restoring spring is provided by a pivot lever articulated on the rear wall of the housing which actuates the final control element. One end of the restoring spring and the armature of the electromagnet both contact the free end of one arm of the pivot lever.

The restoring spring is supported between the bottom of the housing, on which the exciter coil of the magnet with its core is also affixed, and a support part which is displaceably guided in its axial direction. Also, this support part is connected with the transducer rod of the inductive transducer, which projects into the takeup spool which is also affixed to the floor of the housing.

A magnetic final control element of the type described above has material disadvantages.

The disposition of the magnet and the restoring spring which surrounds the displacement transducer requires a great deal of installation space, and the final control element housing is accordingly voluminous. Since the control force of the electromagnet and the restoring force of the restoring spring are each in contact with the large arm of the pivot lever, working in opposite directions like a force pair, and thus tend with accordingly increased force to tip the pivot axis of the pivot lever, then first the housing part which supports the pivot bearing must be very stable in its embodiment (generally it is a cast metal piece) and second the pivot lever must also be embodied as sufficiently bend- and torsion-resistant, so that errors of the armature stroke are, as much as possible, not transmitted to the displacement transducer. However, such errors of transmission which result from the play in the bearing of the pivot lever and/or from changes in friction ratios due to wear in the region of the connection with the armature and with the restoring spring are unavoidable.

OBJECTS AND SUMMARY OF THE INVENTION

The magnetic final control element of the present invention has at least the following advantages over the prior art:

Because of the coaxial disposition of the magnet, displacement transducer and restoring spring and the direct support of the restoring spring provided by a support surface attached to the core and a support surface attached to the armature, no pivotable structural elements are required to supply the force-displacement coupling between the magnet and the restoring spring. Accordingly, because of the resultant reduction of production costs this already represents a significant advantage in and of itself. Beyond this, the errors, necessarily connected with lever rods or the like in transferring the armature stroke onto the displacement transducer are also eliminated, so that improved regulatory precision is also attained. A further substantial advantage resides in the fact that the space requirement of the final control element according to the invention is reduced to approximately one-half that of the known final control element. In addition, the final control element housing, with the exception of a mounting plate on which the exciter coil is secured along with its core, can be much smaller in its embodiment, since the housing part which supports the pick-up portion of the displacement transducer and which seals the final control element against the outside does not absorb any reaction forces. Thus, this housing part can easily be a synthetic part which is inexpensive to produce.

Favorable arrangements of the restoring spring are produced by means of the features outlined in the claims when the restoring spring is embodied as a relatively long helical spring having a relatively small diameter. These arrangements may be realized either alternatively or in combination, should it be desirable to select slighter dimensions for individual springs to attain a certain force/stroke ratio.

An arrangement for the restoring spring as claimed herein also enables a dimensioning of the spring with a favorable, relatively high ratio between diameter and length of the spring. Such a design produces a soft spring, which is particularly advantageous for the work capacity and the dynamics of the final control element.

The magnetic final control element according to the invention can be installed anywhere that control member strokes on the order of magnitude of 1 to 30 mm, or the regulatory values connected therewith, and control forces of approximately 0.5–15 kilopond are to be regulated very precisely. Thus, it is particularly suitable for electronically regulated Diesel or gasoline fuel injection systems in motor vehicles. Naturally, it is also suitable for actuating final control elements in carburetors, or other control elements such as plungers, hydraulic or pneumatic valves, dosing devices and the like, with appropriate adaptation of its dimensions as may be necessary.

Suitable displacement transducers for ascertaining the control element stroke may be, for example, resistance transducers adjustable in proportion to the stroke, but may also be other displacement transducers whose structure permits the structural form of the final control element having the further control members stacked coaxially one inside the other. In practice, inductive displacement transducers having the form disclosed and claimed herein have proved to be particularly favorable.

The beaker-shaped tube provided in accordance with the salient aspects claimed herein particularly that which reveals the armature being connected with the regulator rod provides a number of important and favorable properties. This structure accomplishes a sufficiently exact coaxial connection between the armature and the regulator rod particularly when the axial distance between its rim, secured on the armature, and the end of the regulator rod, secured to the bottom, is relatively large, that is, when it is equal to the maximal armature stroke. Since the shape of the tube provides high shape stability even with low wall strength, the tube can, even when the outer diameter of the take-up spool apparatus is only a very little smaller than the diameter of the central bore of the core protuberance, be so embodied that the end of the pick-up spool apparatus oriented toward the core protuberance projects into the hollow cylindrical section of the tube when the armature is in its one terminal position which is most remote from the core protuberance. On the other hand, this means that the pick-up stool apparatus may be disposed very closely to the core protuberance, so that the axial distance from the core which is to be maintained is determined solely because the magnetic field of the electromagnet should influence the pick-up spool apparatus as little as possible. Thus, with the given armature stroke path and the given axial length of the pick-up spool apparatus, one can attain the minimal total axial structural length of the final control element, which in practice is not larger than in the known magnetic final control element.

Also, as revealed herein and ultimately claimed beaker-shaped tube is guided in every phase of the armature stroke, which is also favorable for the exact coaxial guidance of the transducer rod connected with the regulator rod and with as much freedom from vibration and jarring as is possible.

The invention will be better understood as well as further objects and advantages thereof become more apparent from the ensuing detailed description of the preferred embodiments taken in conjunction with the drawings.

DESCRIPTION OF THE PREFERRED EMBODIMENTS

Figure 1:
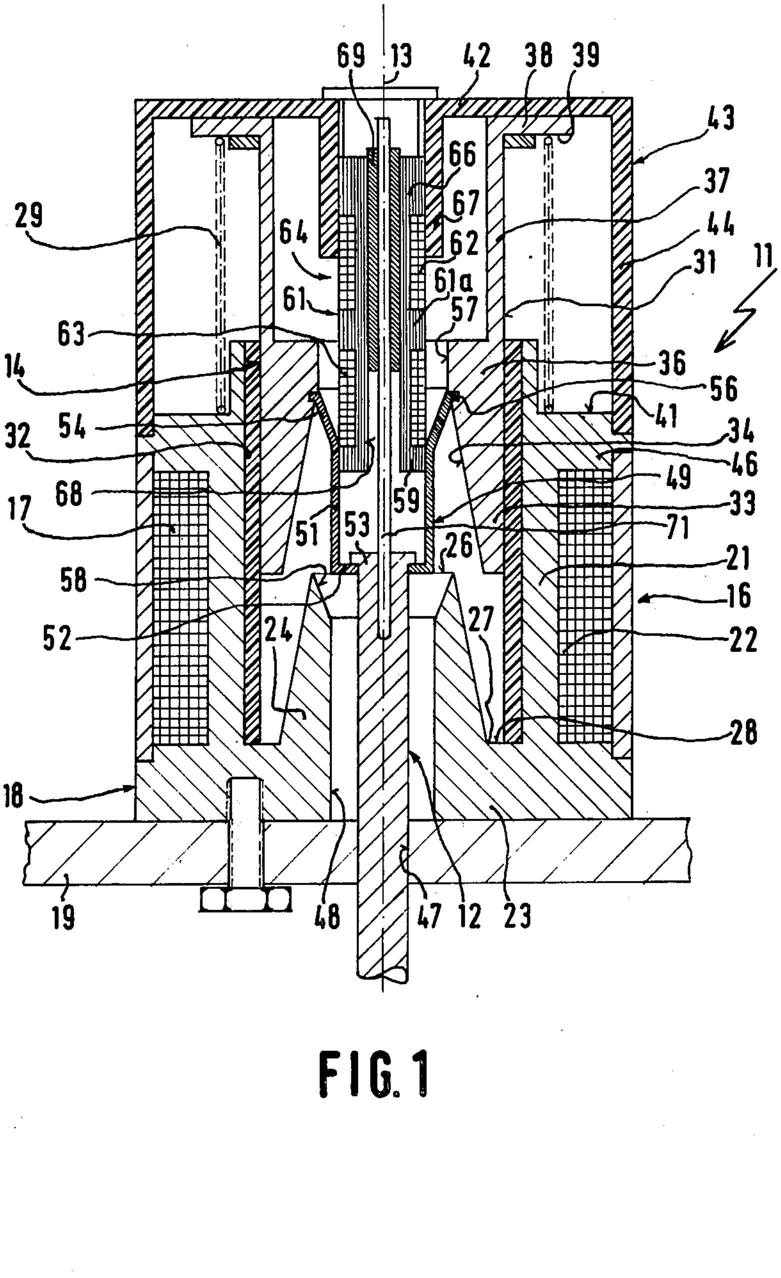
FIG. 1 shows in horizontal cross section one preferred form of a magnetic final control element in accordance with the invention having an outer restoring spring of large helical diameter, which concentrically surrounds at least one section of the armature, containing the central axis of the final control member, approximately on the scale of 2:1.

Turning now to the drawings, the magnetic final control element 11 shown in FIG. 1, whose purpose is the actuation of the regulator rod 12 which serves as the control member of a Diesel injection apparatus, the regulator rod stroke of which determines the fuel quantity injected into the cylinders of the Diesel engine, is embodied symmetrically with the longitudinal axis 13 of the regulator rod 12. The regulator rod 12 is firmly connected with the armature 14 of a direct current electromagnet 16, the armature 14 being capable of reciprocal displacement in the direction of the longitudinal axis 13. The core 18 of the electromagnet 16 which bears the exciter coil 17 is secured to a mounting plate 19 which bears the final control element 11. The core 18 is embodied as a substantially cup-shaped part having a tubular wall section 25 coaxial with the longitudinal axis 13, upon the jacket surface 22 of which wall section 25 the exciter coil 17 is wound and having a massive bottom 23 from which extends a frustoconical core protuberance 24, which tapers toward the top. The axial height measured between the upper edge 26 of the core protuberance 24 and the annular-ring-shaped upper bottom surface 28 which surrounds the base edge 27 of the core protuberance 24 is at least equal to the maximal stroke of the armature 14. In the following description, the terms "stroke of the armature 14" or "stroke of the regulator rod 12" refer to the extent to which the core 14 moves in the axial direction out of the terminal position shown in FIG. 1 against the force of a restoring spring 29 when the exciter coil 17 carries current. The armature 14 is embodied as a tubular part having a cylindrical jacket surface 31, with which it is glidingly guided on a thin-walled inner Teflon coating 32 of the cylindrical core section 21. In its lower region 33 oriented toward the core protuberance 24, the armature 14 has a conical jacket-shaped inner surface 34 which corresponds to the space which is provided between the core protuberance 24 and the Teflon coating 32. Adjacent to the lower, conical region 33 of the armature 14 there is a short (seen in the direction of the longitudinal axis 13) wall section 36 having the maximal wall thickness of the armature 14 and this is integral with a tubular extension 37 of lesser wall thickness and from the upper end of which (as seen in FIG. 1) a flange 38 is directed radially outward. The helical restoring spring 29 is supported between the inner surface 39 of the flange 38 oriented toward the core 18 and a radial front surface 41 of the core 18 directly opposite the surface 29. The ratio of the axial length of the helical spring 29, which coaxially surrounds the extension 37 of the armature 14 on the outside relative to its diameter is approximately 0.5 to 1 kilopond, which when the electromagnet 16 is free of current holds the armature 14 with its radial flange 38 in contact with the cover plate 42 of a cup-shaped housing portion 43 which forms a cover for the final control element. This housing portion 43 is secured in the lower rim region of its cylindrical outer wall 44 to a flange 46 of the core 18 which provides the radial support surface 41. The axial length of the helical spring 29, as well as diameter, together with its elastic force constant and the attainable armature stroke are adapted to each other in a manner such that the restoring force of the spring is approximately 10 kilopond at the maximum armature stroke.

The regulator rod 12 enters into the final control element 11 through an axial guide bore 47 of the mounting plate 19 and extends within a bore 48 which penetrates the core protuberance 24, the diameter of which is significantly (2 to 3 times) greater than the diameter of the regulator rod 12, up to a beaker-shaped connecting member 49, which provides the rigid coaxial connection between armature 14 and regulator rod 12. The connecting member 49 has a lower cylindrical-cup-shaped section 51, on the bottom 52 of which the end 53 of the regulator rod 12 is secured while the upper section 54 thereof widens in a funnel-like manner up to the value of the smallest inner diameter of the armature 14 and to which it is attached, as shown. This section 51 is secured with its upper rim 56 in the region of the obtuse-angled transition edge of the inner wall of the armature 14, at which its conical inner surface 34 merges into the cylindrical inner wall 57 of the central armature part 36. The connecting member 49 has a total axial length approximately corresponding to the maximum armature stroke; of this length, approximately one-half to two-thirds is in the lower, cylindrical section 51. The outer tubular portion of this section 51 corresponds to the inner diameter of the bore 48, and the protuberance 24 has on its upper front face a conically-shaped inwardly tapering area 58, the angle of which corresponds to that of the funnel-like flared section 54 of the connecting member 49. The maximum armature stroke is thus defined by the contact between surfaces of the funnel-like flared section 54 and the inwardly tapering area 58. In order to prevent the armature 14 from sticking in its maximal stroke position as a result of remanence effects in the substance of the armature and core, the connecting member 49 is produced from nonmagnetic material, preferably brass, and at least one of the conical surfaces of the protuberance 24 and the armature 14 is provided with a thin protective layer of synthetic material or laquer, which also assures a minumum distance between these surfaces even in the lower terminal position of the armature 14.

The inner diameter of the cylindrical-cup-shaped section 51 of the connecting member 49 is complemental to the perimeter of the lower end 59 of a longitudinal cylindrical spool body 61, which carries a pick-up spool arrangement 62, 63 that serves as the take-up part of an inductive displacement transducer 64 disposed coaxially with the longitudinal axis 13. The displacement transducer 64 generates an electrical output signal proportional to the stroke of the regulator rod 12, that is, of the armature 14. At its upper end 66, the spool body 61 is firmly seated in a securing tube 67 which is integral with the cover 42 of the housing part 43. The pick-up spool arrangement comprises two electrical partial coils 62 and 63 switched in sequence, which are fed with an alternating-current voltage signal of fixed frequency and given amplitude, for example, a 10 kHz signal. The partial coils 62 and 63 are arranged within annular grooves of the spool body 61 and are separated from one another in axial direction by a narrow bridge 61*a*. A longitudinal tubular ferrite core 69 is guided in a gliding, displaceable manner within a central axial bore 68 of the pick-up spool body 61 and is firmly seated on a rod 71 of brass, or other suitable nonmagnetic material, which forms an axial extension of the regulator rod 12.

The arrangement and dimensions of the partial coils 62 and 63 of the pick-up spool arrangement and those of the ferrite core 69 are selected to be such that a displacement of the armature 14 out of its one terminal position, illustrated in FIG. 1, in the direction of its other terminal position corresponding to the maximum stroke leads to an alteration, very nearly in proportion to the stroke, of the total inductivity of the pick-up spool arrangement 62, 63. Just as in a known magnetic final control element, the stroke of the regulator rod 12 is determined by the balance between the attracting force, which is proportional to the exciter current, of the direct-current magnet 16 and the oppositely directed, stroke-proportional restoring force of the helical spring 29. An electronic regulator (not shown) determines the exciter current level required for a certain stroke from the comparison of the electric output signal of the inductive transducer 64, which is proportional to the momentary value of the stroke, with a set-point signal which can be predetermined as a guidance value.

Figure 2:
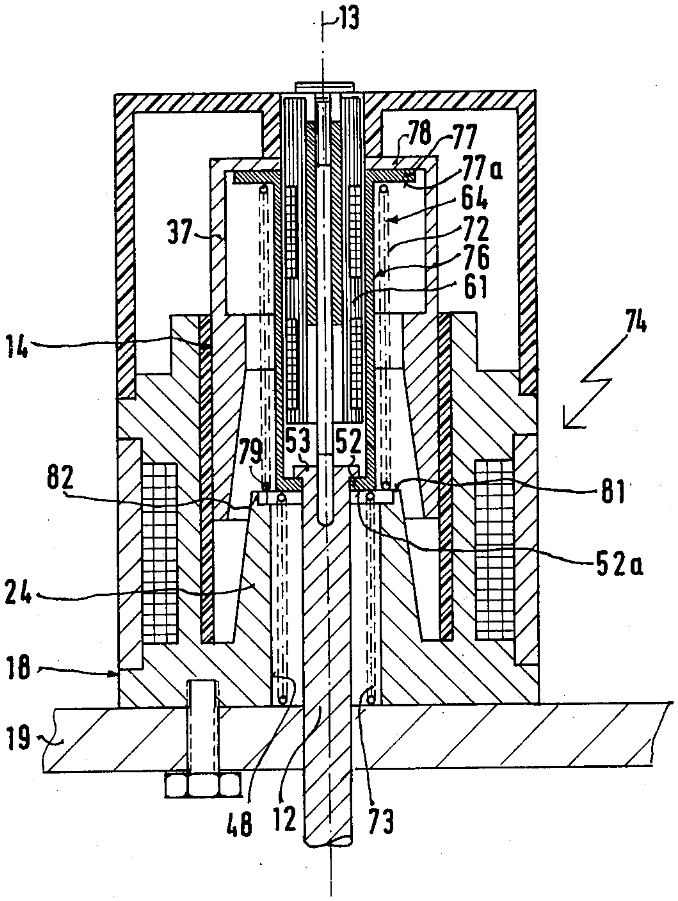
FIG. 2 shows in horizontal cross-section another embodiment of a magnetic final control element in accordance with the invention having restoring springs of smaller diameter, in a cross-sectional representation corresponding to FIG. 1 on a scale of 1:1.

In FIG. 2, two further possibilities for the coaxial arrangement and support, according to the invention, of a restoring spring 72 or 73 within a magnetic final control element 74 are shown. Individual parts have the same reference numerals whenever they are identical with those of the final control element of FIG. 1. In both cases, the restoring springs 72 and 73 are embodied as longitudinally disposed helical elements, where in the relaxed state the ratio of their axial length to the helical diameter is greater than 1 (that is, is 2 to 4). The connecting member 76 which firmly couples the end 53 of the regulator rod 12 with the armature 14 is embodied as a longitudinal, tubular shell member which is glidingly displaceable on the cylindrical spool body 61 of the displacement transducer 64. On its upper end (seen in the view of FIG. 2) the connecting member 76 has a flange 77 directed radially outward with which it is secured to a flange 78 of the armature 14 which extends from the inwardly extending upper end of the tubular extension 37 of the armature 14. On its lower end, the connecting member 76 has a portion that extends inwardly and corresponds to the bottom of the cup-shaped section 51 of the connecting member 49 of FIG. 1. The outer circumference of the tube 76 corresponds to the inner diameter of the central bore 48 of the protuberance 24.

In the first case, the restoring spring 72 is disposed in the interior of the armature 14 coaxially surrounding the tube 76 and is supported with its upper end on a radially outwardly extending supporting element 77*a* of the securing flange 77 of the tube 76, and with its lower end seated on a radial support surface 79 opposite the flange 77 adjacent to the front face of the conically-shaped protuberance 24. The support surface 79 is deeper than the upstanding edge 81 of the protuberance 24 to the approximate extent of the diameter of the helical wire, so that there is a rim 82 which surrounds the support surface 79 in such a way as to prevent the end area of the spring from sliding downwardly into the air gap that is defined by the conical surfaces of the armature 14 and of the protuberance 24. In the illustrated exemplary embodiment, the cited ratio of spring length to helical diameter is approximately 2.5.

In the second case, the helical spring 73 is disposed in the interior of the bore 48 which penetrates the core 18 and its protuberance 24 in the axial direction and is supported between a frontal surface 52*a* of the bottom 52 of the connecting member 76 and the upper surface of the mounting plate 19 which supports the core 18. The ratio of its length to its circumference is approximately 2.

It will be appreciated that in all cases the number of helixes of the restoring springs 29, 72 and 73 and the material strength of the spring wire must be adapted to one another in such a manner than in every case the helixes of the compressed springs rest directly on one another at the maximum armature stroke. The spring arrangements according to FIG. 2 can be realized either alternatively or in combination; the latter is the case when it is desirable to keep the strength of the helical springs 72 and 73 as small as possible.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A magnetic final control element for a regulator apparatus for use in an electronically regulated fuel injection system for motor vehicles, in which the regulatory value is determined by means of the axial stroke of a rod-like control member connected with an armature of an electromagnet disposed in a housing, the armature being movable against the restoring force of a helical spring means, the exciter current of said magnet being the output value of a regulator which as a guidance value receives a set-point signal characteristic of the regulatory value and as an input value to be compared therewith receives an output signal of a displacement transducer which is proportional to the stroke of said rod-like control member, said displacement transducer further comprising a rod-like means which is displaceably coupled with the armature and further including a pick-up means associated with said housing and arranged to extend substantially along the axis of a transducer core, said transducer further having an output signal proportional to its stroke and influenced by the position thereof, and further wherein said electromagnet comprises an armature magnet having an attracting force proportional to said exciter current, said current eminating from an exciter coil which is wound onto the outer jacket of a substantially cylindrical-cup-shaped core, further wherein said control member together with said displacement transducer comprising said pick-up means and said transducer core and said restoring spring means are disposed coaxially with respect to the longitudinal axis of said electromagnet, whereby said restoring spring means is supported with a minimum initial stressing between a support surface integrated into said armature and a further support surface, said pick-up means being disposed in proximity to said armature and remote from said core, said pick-up means having an end portion secured on the inner side of a cover plate firmly connected with said core and said transducer rod-like means is embodied as an element affixed to said control member.

2. A magnetic final control element for a regulator apparatus for use in an electronically regulated fuel injection system for motor vehicles, in which the regulatory value is determined by means of the axial stroke of a rod-like control member connected with an armature of an electromagnetic disposed in a housing, the armature being movable against the restoring force of a helical spring means, the exciter current of said magnet being the output value of a regulator which as a guidance value receives a set-point signal characteristic of the regulatory value and as an input value to be compared therewith receives an output signal of a displacement transducer which is proportional to the stroke of said rod-like control member, said displacement transducer further comprising a rod-like means which is displaceably coupled with the armature and further including a pick-up means associated with said housing and arranged to extend substantially along the axis of a transducer core, said transducer further having an output signal proportional to its stroke and influenced by the position thereof, and further wherein said electromagnet comprises an armature magnet having an attracting force proportional to said exciter current, said current eminating from an exciter coil which is wound onto the outer jacket of a substantially cylindrical-cup-shaped core, further wherein said control member together with said displacement transducer comprising said pick-up means and said transducer core and said restoring spring means are disposed coaxially with respect to the longitudinal axis of said electromagnet, said cup-shaped core having upstanding protuberance having a bore, a spring in said bore, said spring positioned between a mounting plate and a sleeve member, said sleeve member connected at one end to said control member and associated at the opposite end with said armature.

3. A magnetic final control element in accordance with claim 1, further wherein said cup-shaped core further including an upstanding central protuberance having a bore formed complemental to a beaker-shaped member having interior and exterior walls.

4. A magnetic final control element in accordance with claim 3, further wherein said pick-up means comprises a spool core the perimeter of which is complemental to said interior wall of said beaker-shaped member.

5. A magnetic final control element in accordance with claim 1, further wherein said interior and said exterior walls of said beaker-shaped member form guide means for cooperation with a bore provided in said cup-shaped core and the perimeter of said pick-up means.

6. A magnetic final control element in accordance with claim 2, further wherein said upstanding protuberance further includes a shoulder, a spring sealed on said shoulder surrounding said sleeve member, said spring having a top portion in abutment with a flange that contacts said armature.

7. A magnetic final control element in accordance with claim 6, further wherein said protuberance has a shelf portion, a spring having a portion seated on such said portion and another portion encircling said sleeve member and terminating in proximity to said armature.

8. A magnetic final control element in accordance with claim 1, further wherein said control member is affixed to an axial rod means that extends axially of said pick-up means and a ferrite core encompasses a portion of said axial rod means.

9. A magnetic final control element in accordance with claim 2, further wherein said control member is affixed to an axial rod means that extends axially of said pick-up means and a ferrite core encompasses a portion of said axial rod means.

10. A magnetic final control element in accordance with claim 1, further wherein said restoring spring is disposed coaxially of said armature and supported by a radial support flange on said cup-shaped core.

11. A magnetic final control element in accordance with claim 1, further wherein said pick-up means includes a spool body having a bore, a ferrite core element positioned within said bore and a non-magnetic rod means penetrating said ferrite core.

12. A magnetic final control element in accordance with claim 9, wherein said ferrite core is displacable in said bore of said spool body.

* * * * *